United States Patent
Brombach

(10) Patent No.: US 11,482,862 B2
(45) Date of Patent: Oct. 25, 2022

(54) FAULT CONTROL FOR A WIND FARM WITH PRIORITIZATION OF THE EXTERNAL SETPOINT-VALUE SPECIFICATIONS

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/285,041

(22) PCT Filed: Oct. 14, 2019

(86) PCT No.: PCT/EP2019/077719
§ 371 (c)(1),
(2) Date: Apr. 13, 2021

(87) PCT Pub. No.: WO2020/078872
PCT Pub. Date: Apr. 23, 2020

(65) Prior Publication Data
US 2021/0328429 A1    Oct. 21, 2021

(30) Foreign Application Priority Data

Oct. 15, 2018  (DE) .................... 10 2018 125 445.8

(51) Int. Cl.
*H01B 7/30* (2006.01)
*H01B 11/02* (2006.01)
(Continued)

(52) U.S. Cl.
CPC ............ *H02J 3/0012* (2020.01); *F03D 7/048* (2013.01); *F03D 9/257* (2017.02); *G08B 21/18* (2013.01);
(Continued)

(58) Field of Classification Search
CPC ........ H02J 3/0012; H02J 3/00125; H02J 3/04; H02J 3/14; H02J 3/381; H02J 3/46;
(Continued)

(56) References Cited

U.S. PATENT DOCUMENTS

| 8,203,318 B2 | 6/2012 | Fortmann |
| 2010/0213712 A1* | 8/2010 | Arinaga ................ H02J 3/381 290/44 |

(Continued)

FOREIGN PATENT DOCUMENTS

| DE | 102008062356 A1 | 7/2010 |
| DE | 102016123384 A1 | 6/2018 |

(Continued)

*Primary Examiner* — Richard Tan
(74) *Attorney, Agent, or Firm* — Seed Intellectual Property Law Group LLP

(57) ABSTRACT

A method for controlling a wind farm, which is operated by means of a wind farm control unit and comprises a multiplicity of wind power installations having wind power installation controllers and being connected to one another via a common wind farm grid, which is connected to an electrical power supply grid of a grid operator by means of a wind farm transformer, comprising the following steps: reception of at least one fault bit at the wind farm control unit, in particular at least one fault bit of the grid operator, deactivation of all external setpoint value specifications at the wind farm control unit apart from those of the grid operator after reception of the fault bit, activation of a closed-loop fault case control implemented in the wind farm control unit after successful deactivation of all external setpoint value specifications apart from those of the grid operator.

18 Claims, 3 Drawing Sheets

(51) Int. Cl.
  H02B 1/20 (2006.01)
  H02G 5/06 (2006.01)
  H02J 3/00 (2006.01)
  F03D 9/25 (2016.01)
  F03D 7/04 (2006.01)
  G08B 21/18 (2006.01)
  H02J 3/38 (2006.01)
  H02J 3/46 (2006.01)
  H02J 3/04 (2006.01)
  H02J 3/14 (2006.01)
  H02J 9/06 (2006.01)
  H02J 13/00 (2006.01)

(52) U.S. Cl.
  CPC ............ H02J 3/00125 (2020.01); H02J 3/04 (2013.01); H02J 3/14 (2013.01); H02J 3/381 (2013.01); H02J 3/46 (2013.01); H02J 9/062 (2013.01); H02J 13/00002 (2020.01); *F05B 2220/706* (2013.01); *H02J 2300/28* (2020.01); *H02J 2310/18* (2020.01)

(58) Field of Classification Search
  CPC .. H02J 9/062; H02J 13/00002; H02J 2300/28; H02J 2310/18; H02J 3/50; H02J 2300/10; F03D 7/048; F03D 9/257; F03D 7/0284; G08B 21/18; F05B 2220/706; F05B 2270/107; Y02B 90/20; Y02E 10/72; Y02E 10/76; Y04S 20/12
  USPC ........................................................ 307/147
  See application file for complete search history.

(56) References Cited

U.S. PATENT DOCUMENTS

| | | |
|---|---|---|
| 2017/0025859 A1* | 1/2017 | Garcia .................... F03D 7/048 |
| 2020/0003181 A1 | 1/2020 | Brombach et al. |
| 2020/0381921 A1 | 12/2020 | Brombach |

FOREIGN PATENT DOCUMENTS

| | | | |
|---|---|---|---|
| DE | 102016124840 | * | 6/2018 |
| DE | 102016124840 A1 | | 6/2018 |
| EP | 2636894 | * | 9/2013 |
| EP | 2636894 A2 | | 9/2013 |

* cited by examiner

FAULT CONTROL FOR A WIND FARM WITH PRIORITIZATION OF THE EXTERNAL SETPOINT-VALUE SPECIFICATIONS

BACKGROUND

Technical Field

The present invention relates to a method for controlling a wind farm and to such a wind farm.

Description of the Related Art

Wind farms generally have a plurality of wind power installations, which are connected to one another via a common wind farm grid.

In order to inject the electrical power generated by means of the wind power installations into an electrical power supply grid, the wind farm grid is generally connected to the electrical power supply grid by means of a connecting line and a wind farm transformer.

The increasing penetration of converter-controlled generating units, such as, for example, wind power installations or photovoltaic installations, on the electrical power supply grid results in an increasing displacement of conventional generating units, such as, for example, coal-fired power stations, which are generally responsible for the grid recovery of the electrical power supply grid when it has a severe grid fault, such as, for example, a blackout.

Since the grid properties of the electrical power supply grid have been shifted in an electrical power supply grid with a high degree of penetration by converter-controlled generating units, known wind power installations are suitable for participating in an effective grid recovery of the electrical power supply grid only to a certain extent.

The German Patent and Trademark Office has searched the following prior art in respect of the priority application relating to the present PCT application: DE 10 2016 123 384 A1, DE 10 2016 124 840 A1 and DE 10 2008 062 356 A1.

BRIEF SUMMARY

One or more embodiments provide improved techniques for controllability of wind farms in the case of a fault on the electrical power supply grid.

Provided is a method for controlling a wind farm, which is operated by means of a wind farm controller and comprises a plurality of wind power installations having wind power installation controllers and being connected to one another via a common wind farm grid, which is connected to an electrical power supply grid of a grid operator by means of a wind farm transformer, comprising the following steps: reception of at least one fault bit at the wind farm controller, in particular at least one fault bit of the grid operator; deactivation of all external setpoint value specifications at the wind farm controller apart from those of the grid operator after reception of the fault bit; activation of a closed-loop fault case control implemented in the wind farm controller after successful deactivation of all external setpoint value specifications apart from those of the grid operator.

A method for controlling a wind farm which has a plurality of wind power installations which are connected to one another via a common wind farm grid is therefore proposed.

For this purpose, the wind farm has a central wind farm controller, which is designed at least to receive data from a grid operator and, in addition or as an alternative, to control the individual wind power installations of the wind farm.

The wind power installations themselves preferably likewise have, for this purpose, at least one wind power installation controller, which is preferably designed to communicate with the wind farm controller, i.e., to send data to said wind farm controller and to receive data from said wind farm controller.

In a first step of the method, the wind farm controller now receives a fault bit, in particular the fault bit of a grid operator.

For this purpose, for example, a secure line can be provided between the wind farm controller and the grid operator. The secure line can be provided, for example, by an underground cable or by a radio link. The secure line can, however, also be a fiber optic cable or a VPN tunnel, in particular of a smart meter gateway.

The fault bit itself should preferably be understood as a separate signal which, in the simplest case, only consists of one bit, i.e., either "0" or "1", and is intended to trigger a closed-loop fault case control in the wind farm controller, i.e., a special operating case or an operating mode: closed-loop fault case control.

Preferably, the fault bit is configured in such a way that a signal is only present in a fault case, i.e., "1".

After reception of the fault bit, all other external setpoint value specifications are deactivated. This means in particular that the installation operator or direct marketer or other third parties no longer has access to the control of the wind farm, in particular the wind farm controller.

It is therefore in particular proposed that, in the case of a fault on the electrical power supply grid, the grid operator can set the wind farm to autonomous closed-loop fault case control.

In a next step, a closed-loop fault case control implemented in the wind farm controller or an operating mode: closed-loop fault case control is then activated, in particular as described below.

During the closed-loop fault case control itself, in this case preferably at least the following properties are met: deactivation of all external setpoint value specifications apart from those via the grid operator interface; deactivation of all control range limitations, in particular by closed-loop wind farm control or by the wind farm controller; setting of startup prevention in the case of a temporary loss of voltage or setting of the active power to zero after voltage recovery.

It is therefore in particular also proposed that, on activation of the closed-loop fault case control, there is a switchover to an operational strategy matched to the grid operator, in particular in such a way that the wind farm has an operational strategy matched to the grid operator. This means in particular also that both the parameters of the wind farm controller and the parameters of the wind power installation controller are changed.

The wind farm therefore has at least one operating mode: normal operation and one operating mode: closed-loop fault case control, in particular as described below. For this purpose, preferably different sets of parameters are stored in the wind farm controller.

Preferably, the wind farm controller has a control range limitation, and the method further comprises the following step: deactivation of the control range limitation after reception of the fault bit.

It is therefore in particular proposed that, if the wind farm controller and/or the wind farm has a settable control range which can be limited, to deactivate this control range.

For example, the wind farm has a control range for the reactive power which is limited to a cos(phi) of 0.95. This is performed, for example, when the grid connection guidelines only require such a control range. Therefore, additional losses as a result of the output of unrequired reactive power are avoided. Physically, the wind farm has, however, a control range of 0.5 $P_{rated}$, for example.

For this purpose, it is now proposed to deactivate this control range limitation, in particular in order to operate the wind farm at the limit of its physical control capability in order to support the electrical power supply grid in the best possible way in the case of a fault or to assist the grid recovery in the best possible way.

Preferably, the wind farm controller has an active power setpoint value specification for the plurality of wind power installations, and the method further comprises the following step: setting of the active power setpoint value specification to a value equal to zero.

It is therefore in particular proposed that, if the wind farm controller has an active power setpoint value specification for the plurality of wind power installations, to set this specification to zero.

The wind power installations of the wind farm then therefore first do not inject any active power into the wind farm grid during the closed-loop fault case control.

Preferably, the method further comprises the following step: requesting of a status of the wind power installations by means of the wind farm controller in the case of the wind power installation controllers.

It is therefore in particular proposed that the wind farm controller requests the status of the wind power installations during the closed-loop fault case control, for example whether the wind power installations are operation-ready, in particular are operation-ready for the closed-loop fault case control.

In a particularly preferred embodiment, the wind farm controller in the case of the wind power installations further requests an active power to be expected.

For this purpose, the wind power installations have, in their controller, for example, a power prediction unit, which is designed to predict an active power to be expected depending on a weather forecast.

It is particularly advantageous here that the wind farm controller is supplied with the power values to be expected of the wind power installations, then reports these power values to the grid operator, for example, or uses them to control the wind farm more efficiently in the case of the closed-loop fault case control.

Preferably, the method further comprises the following step: transmission of warning signals by means of the wind power installation controllers to the wind farm controllers and/or transmission of warning signals by means of the wind farm controller to the grid operator.

It is therefore in particular proposed to transmit data between the wind farm controllers and the wind farm control unit and, in addition or as an alternative, between the wind farm controller and the grid operator which reflect the status of the wind power installations and the wind farm, respectively, in particular in order to ensure the functional scope to be expected of the grid recovery.

For example, if a lull in the wind occurs in the region of the wind farm which results in the wind farm no longer being able to perform or completely perform its closed-loop fault case control. For example, the controllability of the wind farm as such can also fail. If this has been established by the wind farm controller, for example by warning signals from the individual wind power installations, a corresponding warning notification is sent to the grid operator. Therefore, the grid operator always knows from the warning notifications whether the wind farm can participate in the closed-loop fault case control and/or whether the wind farm is still part of the closed-loop fault case control. The grid operator is therefore able at all times to identify non-participation of a wind farm and to request a corresponding closed-loop fault case control from another wind farm or activate this.

This is particularly advantageous if the grid operator, for example, requires a minimum power in order to recover the electrical power supply grid once it has gone into a blackout, i.e., had substantially no power supply grid voltage anymore.

Preferably, the fault bit is received when the electrical power supply grid has gone into a blackout.

It is therefore in particular proposed that the fault bit is used to activate a grid recovery mode.

For example, for this purpose, in a first step, the fault bit is transmitted by the grid operator to the wind farm controller, which hereby activates its closed-loop fault case control. In a second step, in addition a wind farm grid recovery mode can then be activated, which is part of the closed-loop fault case control.

The closed-loop fault case control is therefore preferably configured for the grid recovery of the electrical power supply grid.

Preferably, the closed-loop fault case control is activated when the wind farm injects an electrical power into the electrical power supply grid which is zero.

In principle, it is also conceivable to activate the closed-loop fault case control when the wind farm is still injecting electrical power into the electrical power supply grid.

In a preferred embodiment, however, it is proposed that the wind farm first freezes its injection of electrical power after reception of the fault bit and then starts up its power, preferably using power ramps, corresponding to the closed-loop fault case control.

Preferably, the wind farm controller has a startup time which is less than the startup time of the plurality of wind power installations.

It is therefore in particular proposed to design the wind farm controller in such a way that it is fully operational first in the event of a system failure, in particular even before the wind power installations are fully operational again. It is therefore ensured that the fault bit can be received and can be passed on to the wind power installations before the wind power installations begin to inject power in an uncontrolled manner.

Provided is a wind farm, comprising a plurality of wind power installations, a wind farm grid connecting the plurality of wind power installations, and a wind farm controller, which is designed to implement at least a method as described above or below.

The wind farm controller is therefore in particular designed to operate the wind farm in an operating mode: normal operation and in an operating mode: closed-loop fault case control.

For the operating mode: closed-loop fault case control, for example, a further set of parameters is provided, the set of fault case parameters. The set of fault case parameters is in this case preferably stored in the wind farm controller and, in addition or as an alternative, in the wind power installation controllers. The set of fault case parameters in this case preferably comprises at least one function from the following list:

a) in the case of temporary loss of voltage on the electrical power supply grid: startup of all of the wind power installations and preparation for injection, wherein the active power and reactive power setpoint value which is transmitted from the wind farm controller to the wind power installation controller remains at zero;

b) on activation of the operating mode: normal operation: setting of the active power setpoint value of the wind power installation controllers by means of the wind farm controller to a present input power;

c) on activation of the operating mode: closed-loop fault case control: deactivation of all of the control range limitations of the wind farm controller;

d) closed-loop active power control with derivative-action power and P(f) characteristic without a dead band;

e) predefined active power ramps (control rate) in the case of new setpoint values;

f) no authorization of setpoint values greater than $P_{available}-10\% P_{available}$ (or $P_{rated}$), in particular in order to ensure a control reserve;

g) slow ramping down, for example over 15 minutes, of the setpoint values in the case of a restricted control reserve;

h) specification of a new setpoint frequency, which is in particular not equal to a rated grid frequency;

i) closed-loop reactive power control with matched Q(U) characteristic without a dead band;

j) predefined reactive power ramp (reactive power control rate) in the case of new setpoint values;

k) mode of operation dependent on centrifugal mass;

l) matching of the active power ramps and the control rate to the centrifugal mass in the system;

m) fault ride-through strategy for electrical power supply grids with a low centrifugal mass component.

In a preferred embodiment, the wind power installations of the wind farm each have a wind power installation controller, which is designed to exchange data with the wind farm controller, preferably setpoint values and/or warning signals or status signals.

In addition, it is proposed that, in the closed-loop fault case control, the response to voltage and frequency events on the electrical power supply grid takes place as quickly as possible. Therefore, new setpoint values should be started up corresponding to a predefined ramp. Preferably, the closed-loop control of the voltage and the frequency takes place, in particular with a maximum possible dynamic, for example twice $P_{rated}$ per second or 10 times $Q_{rated}$ per second, in particular both in the positive and in the negative direction.

It is therefore proposed to position the functions described above or below as close to the wind power installations as possible, in particular in order to reduce system runtimes. Thus, it is sensible, for example, to preset parameters for a fault ride-through strategy or a closed-loop power/frequency control by the wind farm controller, but to realize the performance by the wind power installations themselves, i.e., in particular by the wind power installation controller.

Preferably, the wind farm controller has at least an operator interface, which is designed to receive external setpoint value specifications, and a grid operator interface, which is designed to receive the fault bit.

The wind farm controller therefore has at least two interfaces for wind farm-external data exchange, wherein an interface is provided exclusively for the grid operator, namely the grid operator interface, by means of which preferably the fault bit is received.

In a further preferred embodiment, the wind farm controller also has at least one wind power installation interface, which is designed to send setpoint values to the wind power installations.

Preferably, the wind farm controller also has a wind power installation warning interface, which is designed to receive warning signals from wind power installations, and, in addition or as an alternative, a wind farm warning interface, which is designed to send warning signals to the grid operator.

The warning signals are in this case preferably intended to reflect a status of the wind power installation and the wind farm, respectively.

In addition, preferably the wind farm controller has at least one interface or a further interface, which performs at least one of the following functions: activation of an operating mode: closed-loop fault case control; disconnection or ignoring of all external setpoint value specifications apart from the grid operator; inputting of new setpoint value, such as, for example, setpoint frequency; reception and/or sending of warning signals, in particular in relation to the primary closed-loop control capacity, in relation to the reactive power control range, in relation to the availability of the wind farm, in relation to status signals, in relation to P-Available, in relation to Q-Available, in relation to the present primary closed-loop control capacity or in relation to the operating mode: closed-loop fault case control.

Preferably, the wind farm further comprises an uninterruptible voltage supply, which is designed to supply electrical power to the wind farm controller and/or the plurality of wind power installations for a predetermined time period in such a way that the wind farm can perform a black start even when the electrical power supply grid has no voltage.

In a preferred embodiment, the uninterruptible voltage supply is at least configured such that at least the communication between the wind farm controller and the grid operator can be maintained.

Preferably, the predetermined time period is at least 4, preferably at least 8, hours.

It is therefore in particular proposed that the uninterruptible voltage supply is dimensioned such that the wind farm can implement its closed-loop fault case control autonomously, i.e., even in the case of a lull in the wind, for at least 4, preferably at least 8, hours.

In a particularly preferred embodiment, the predetermined time period is at least 48 hours.

Preferably, the wind power installations each have a wind power installation controller, which is designed to be operated at least with a set of operational parameters and a set of fault case parameters and to change over between the set of operational parameters and the set of fault case parameters in response to a signal from the wind farm controller.

It is therefore in particular proposed that the wind power installations of the wind farm can be operated with at least two different sets of parameters, wherein at least one set of parameters is provided for the closed-loop fault case control.

The set of fault case parameters in this case has the functions described above or below, in particular those which the set of fault case parameters of the wind farm controller also has.

The wind power installations are therefore configured and designed for at least two different operating modes, wherein an operating mode is provided specifically for the closed-loop fault case control.

Preferably, the wind farm controller is designed to detect at least one variable of the electrical power supply grid which indicates a fault case on the electrical power supply grid in order to generate the fault bit, and to generate the fault bit.

It is therefore in particular proposed that the wind farm controller identifies a fault case automatically and automatically introduces the closed-loop fault case control without the grid operator needing to call out the fault case.

It is particularly advantageous here that the automatic identification of the fault case by the wind farm is markedly quicker than the fault case identification by the grid operator.

Provided is a wind power installation of a wind farm as described above or below, comprising a wind power installation controller, which is designed to be operated at least with a set of operational parameters and a set of fault case parameters and to change over the wind power installation controller between the set of operational parameters and the set of fault case parameters in response to a signal from the wind farm controller, in particular in order to contribute to a method as described above or below.

BRIEF DESCRIPTION OF THE SEVERAL VIEWS OF THE DRAWINGS

The present invention will now be explained in more detail below by way of example and using exemplary embodiments with reference to the attached figures, wherein the same reference symbols are used for similar or functionally identical components.

DETAILED DESCRIPTION

Figure 1:
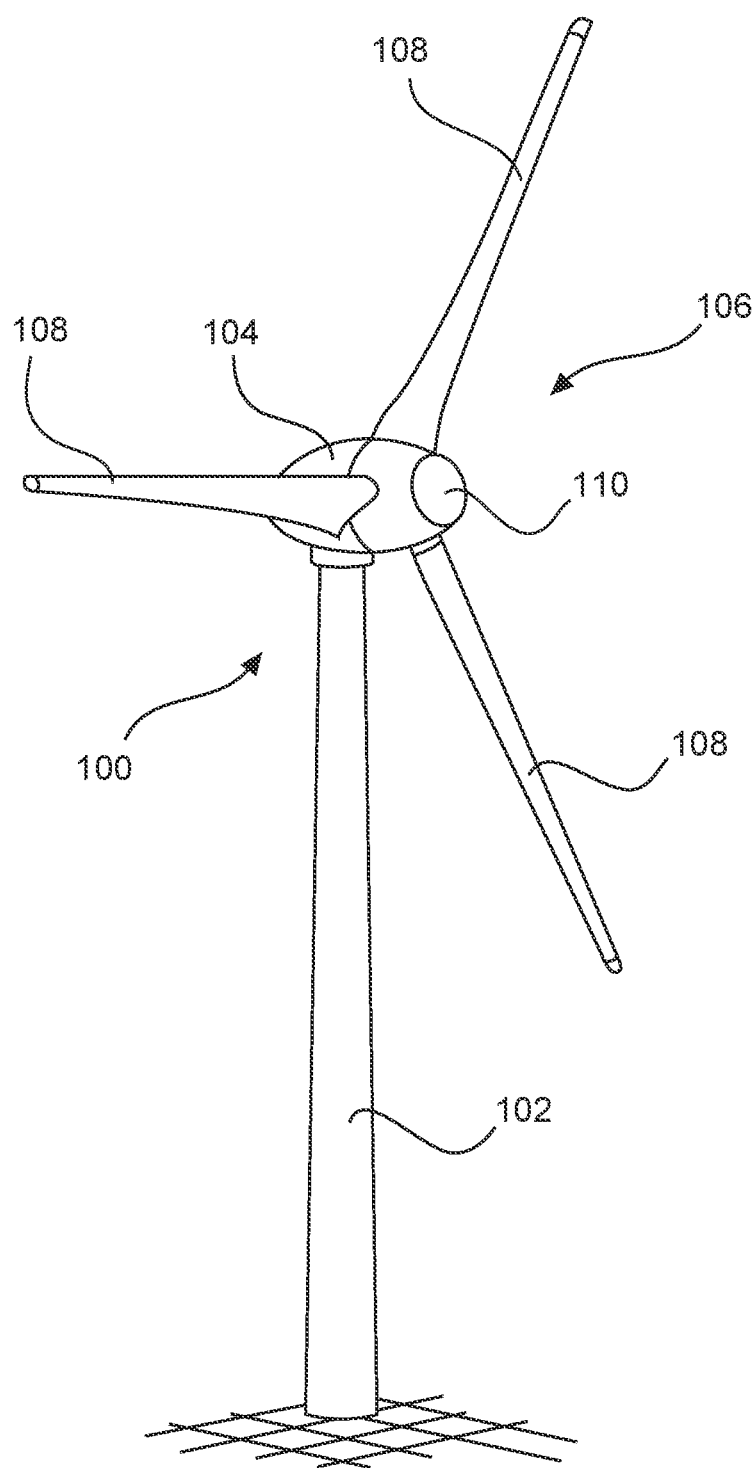
FIG. 1 shows a schematic view of a wind power installation of a wind farm.

FIG. 1 shows a wind power installation 100 according to the invention of a wind farm according to the invention.

The wind power installation 100 for this purpose has a tower 102 and a nacelle 104. An aerodynamic rotor 106 having three rotor blades 108 and a spinner 110 is arranged on the nacelle 104. The rotor 106 is set in rotary motion by the wind during operation and thereby drives a generator in the nacelle 104.

Hereby, the generator generates a current, which is passed to a wind power installation transformer by means of a full-power converter, said wind power installation transformer being connected to a wind farm grid.

For this purpose, the wind power installation has a wind power installation controller, which is designed to drive the full-power converter, in particular with a set of operational parameters and a set of fault case parameters.

Figure 2:
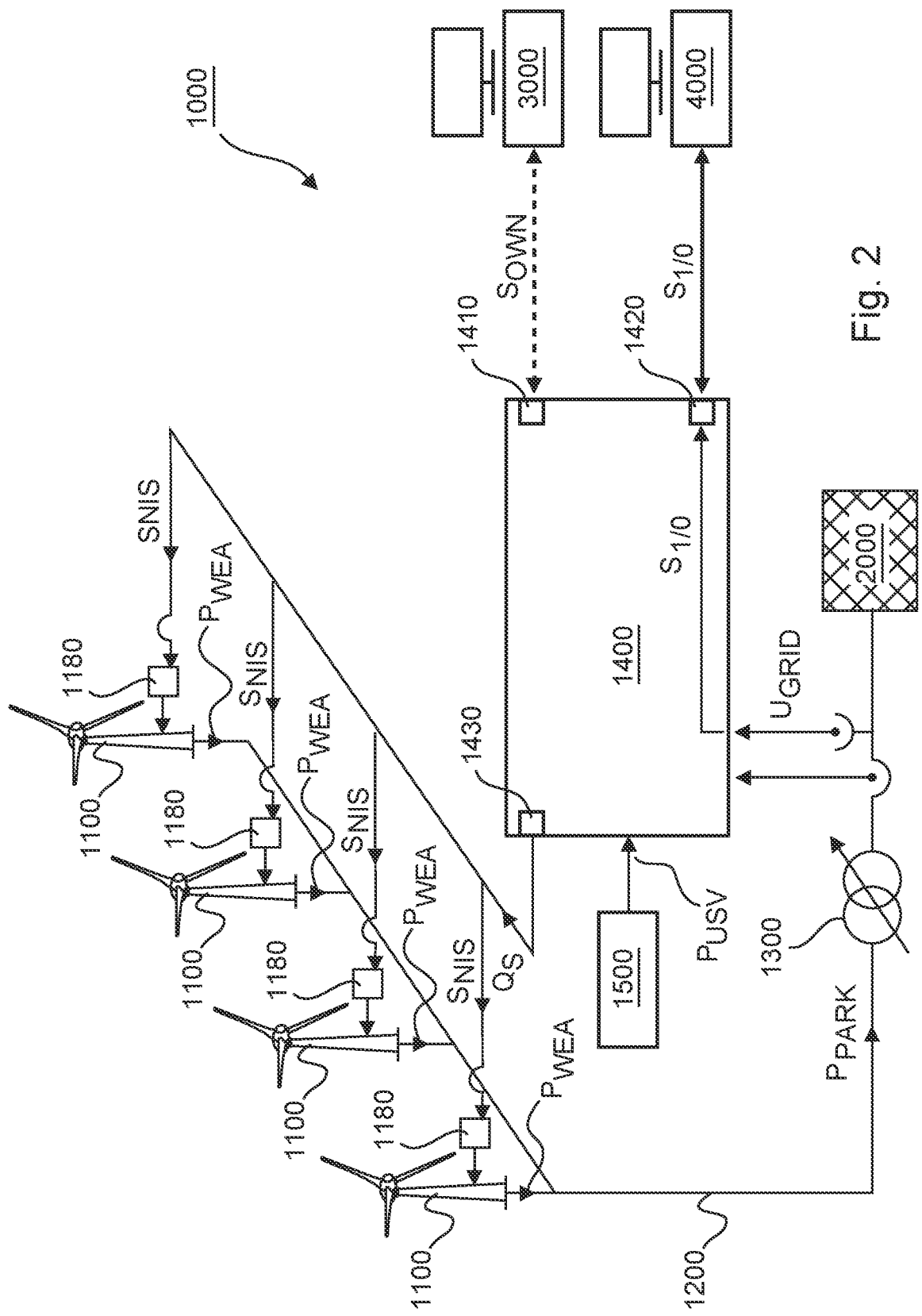
FIG. 2 shows a schematic design of a wind farm according to the invention in one embodiment.

FIG. 2 shows a schematic design of a wind farm 1000 according to the invention in one embodiment.

The wind farm 1000 comprises a plurality of wind power installations 1100, as shown in FIG. 1, for example, which are connected to one another via a common wind farm grid 1200.

The wind farm grid 1200 is connected to an electrical power supply grid 2000 by means of a wind farm transformer 1300 in order to inject an electrical wind farm power $P_{farm}$, which is composed of a sum of the individual electrical wind power installation powers $P_{wpi}$.

In addition, the wind farm 1000 has a wind farm controller 1400 for controlling the wind farm 1000.

The wind farm controller 1400 comprises an operator interface 1410, a grid operator interface 1420 and a wind power installation interface 1430.

The operator interface 1410 is designed to receive external setpoint value specifications $S_{own}$, which are preset, for example, by a wind farm operator 3000.

The grid operator interface 1420 is designed to receive at least one fault bit $S_{1/0}$ from a grid operator 4000.

The wind power installation interface 1430 is designed to transmit setpoint values, for example reactive power setpoint values Qs, to the wind power installations 1100 of the wind farm 1000 in order to control the wind farm 1000 and in particular the electrical wind farm power $P_{farm}$.

In addition, the wind farm controller 1400 is designed to detect at least one variable of the electrical power supply grid, in particular the grid voltage $U_{grid}$, which indicates a fault case on the electrical power supply grid 2000, in particular in order to generate the fault bit $S_{1/0}$ itself.

The wind farm controller 1400 is therefore also designed to trigger the closed-loop fault case control itself, and in particular automatically.

In addition, an uninterruptible voltage supply 1500 is provided, which is designed to supply electrical power $P_{uvs}$ to the wind farm controller 1400 and optionally the plurality of wind power installations 1100 for a predetermined time period in such a way that the wind farm 1000 can perform a black start even when the electrical power supply grid 2000 has no voltage. The predetermined time period is in this case at least 8 hours, for example.

In addition, the wind power installations 1100 each have a wind power installation controller 1180, which receive the setpoint values Qs from the wind farm controller 1400 and are designed to be operated at least with a set of operational parameters and a set of fault case parameters in order to control the wind power installations 1100 correspondingly as described above or below.

The wind power installation controllers 1180 are further designed to change over between the set of operational parameters and the set of fault case parameters in response to a signal $S_{n/s}$ from the wind farm controller 1400 in order to operate the wind power installations 1100 correspondingly as described above or below.

Figure 3:
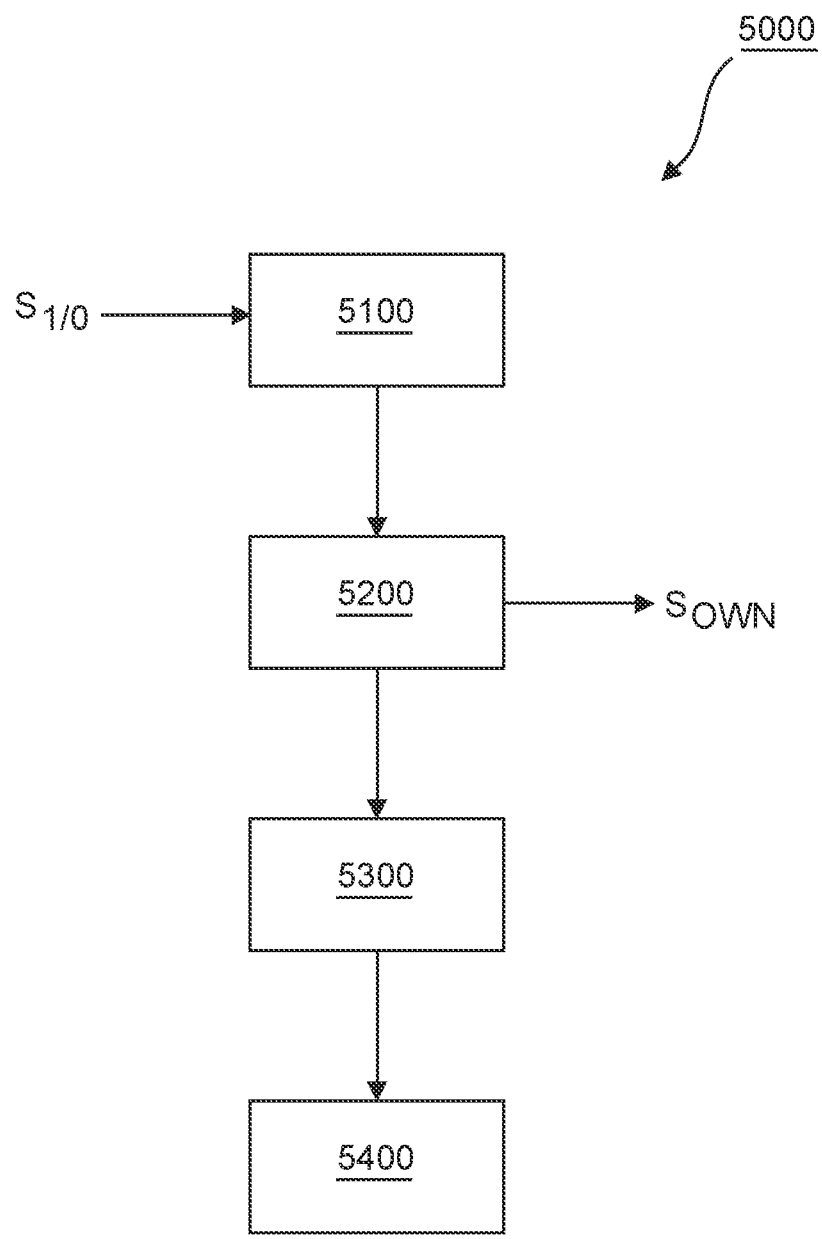
FIG. 3 shows a schematic sequence of a method for controlling a wind farm, in particular the activation of the closed-loop fault case control of a wind farm controller.

FIG. 3 shows a schematic sequence of a method 5000 for controlling a wind farm, in particular as shown in FIG. 2.

In a first step 5100, the fault bit Sim of the grid operator is received at the wind farm controller 1400.

Hereupon, in a second step 5200, all external setpoint value specifications $S_{own}$ are deactivated at the wind farm controller 1400.

Then, in a third step 5300, a closed-loop fault case control implemented in the wind farm control unit 1400 is activated, which closed-loop fault case control preferably deactivates the control range limitation of the wind farm controller 1400.

Finally, in a last step 5400, the wind farm 1000, and in particular the wind power installations 1100 of the wind farm 1000, is operated in an operating mode: closed-loop fault case control, which has at least one of the above functions.

The invention claimed is:

1. A method comprising:
controlling a wind farm using a wind farm controller, the wind farm comprising a plurality of wind power installations having wind power installation controllers, respectively, and being connected to one another via a common wind farm grid, which is connected to an electrical power supply grid of a grid operator by a wind farm transformer, the controlling comprising:
receiving a fault bit at the wind farm controller;
deactivating external setpoint value specifications at the wind farm controller, apart from setpoint value specifications received from the grid operator, after receiving the fault bit; and
activating a closed-loop fault case control implemented in the wind farm controller after successful deactivation of the external setpoint value specifications.

2. The method as claimed in claim 1, wherein the wind farm controller has control range limitation, controlling further comprising:
deactivating the control range limitation after receiving the fault bit.

3. The method as claimed in claim 1, wherein the wind farm controller has an active power setpoint value specification for the plurality of wind power installations, wherein the controlling further comprises:
setting of the active power setpoint value specification to a value equal to zero.

4. The method as claimed in claim 1, further comprising: requesting a status of the wind power installations.

5. The method as claimed in claim 1, further comprising transmitting warning signals from the wind power installation controllers to the wind farm controller.

6. The method as claimed in claim 1, wherein the fault bit is received when the electrical power supply grid has gone into a blackout.

7. The method as claimed in claim 1, wherein the closed-loop fault case control is activated when the wind farm injects an electrical power into the electrical power supply grid which is zero.

8. The method as claimed in claim 1, wherein the wind farm controller has a startup time that is less than a startup time of the plurality of wind power installations.

9. The method as claimed in claim 1, wherein the fault bit is from the grid operator.

10. The method as claimed in claim 1, further comprising transmitting one or more warning signals from the wind farm controller to the grid operator.

11. A wind farm comprising:
a plurality of wind power installations;
a wind farm grid coupled to the plurality of wind power installations; and
a wind farm controller configured to:
receive a fault bit;
in response to receiving the fault bit, deactivate all external setpoint value specifications except setpoint value specifications received from a grid operator; and
activate a closed-loop fault case control.

12. The wind farm as claimed in claim 11, wherein the wind farm controller comprises:
an operator interface configured to receive external setpoint value specifications; and
a grid operator interface configured to receive the fault bit.

13. The wind farm as claimed in claim 11, further comprising:
an uninterruptible voltage supply configured to supply electrical power to the wind farm controller and the plurality of wind power installations for a predetermined time period in such a way that the wind farm has suitable time to perform a black start even when an electrical power supply grid coupled to the wind farm has no voltage.

14. The wind farm as claimed in claim 13, wherein the predetermined time period is four or more hours.

15. The wind farm as claimed in claim 14, wherein the wind power installations each have a wind power installation controller configured to:
be operated at least with a set of operational parameters and a set of fault case parameters; and
change over the wind power installation controller between the set of operational parameters and the set of fault case parameters in response to a signal from the wind farm controller.

16. The wind farm as claimed in claim 15, wherein the wind farm controller is configured to:
detect at least one variable of the electrical power supply grid which indicates a fault case on the electrical power supply grid in order to generate the fault bit, and generate the fault bit.

17. The wind farm as claimed in claim 13, wherein the predetermined time period is eight hours.

18. The wind farm as claimed in claim 11, wherein one of the plurality of wind power installations comprises a wind power installation controller configured to:
be operated at least with a set of operational parameters and a set of fault case parameters; and
change over the wind power installation controller between the set of operational parameters and the set of fault case parameters in response to a signal from the wind farm controller.

* * * * *